United States Patent
Hendriks et al.

(12) 
(10) Patent No.: US 6,567,365 B1
(45) Date of Patent: May 20, 2003

(54) OPTICAL SCANNING DEVICE

(75) Inventors: Bernardus H. W. Hendriks, Eindhoven (NL); Sjoerd Stallinga, Eindhoven (NL); Hendrik Van Houten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 270 days.

(21) Appl. No.: 09/671,983

(22) Filed: Sep. 28, 2000

(30) Foreign Application Priority Data

Sep. 30, 1999 (EP) .............................................. 99203184

(51) Int. Cl.[7] ................................................ G11B 7/00
(52) U.S. Cl. .............................. 369/112.02; 369/112.24
(58) Field of Search ....................... 369/112.02, 112.23, 369/112.24, 112.27, 94, 44.23, 53.35

(56) References Cited

U.S. PATENT DOCUMENTS

| | | | |
|---|---|---|---|
| 5,889,789 A | 3/1999 | Sanada | 371/28 |
| 5,946,282 A * | 8/1999 | Hirono et al. | 369/112.02 |
| 6,094,410 A * | 7/2000 | Fan et al. | 369/94 |
| 6,229,600 B1 * | 5/2001 | Martynov | 356/123 |
| 6,381,208 B1 * | 4/2002 | Abe et al. | 369/112.01 |
| 6,399,932 B1 * | 6/2002 | Wals | 250/201.5 |

FOREIGN PATENT DOCUMENTS

| | | |
|---|---|---|
| JP | 9306013 | 11/1997 |
| JP | 10124921 A * | 5/1998 |

* cited by examiner

Primary Examiner—Thang V. Tran
(74) Attorney, Agent, or Firm—Michael E. Belk

(57) ABSTRACT

An optical scanning device for scanning an optical record carrier. A high numerical aperture objective lens system includes at least a first lens element (12) arranged to converge the beam to a certain extent and a second lens element (13) arranged to converge the beam to a greater extent. The device comprises a spherical aberration compensation optical subsystem including an electro-optical element for altering an optical path length in a spherical aberration generating region, which region is located in the optical path between the first lens element and the location of the record carrier in the device.

21 Claims, 5 Drawing Sheets

OPTICAL SCANNING DEVICE

FIELD OF THE INVENTION

This invention relates to an optical scanning device for scanning an optical record carrier, such as an optical disk, comprising an information layer, the device comprising a radiation source for generating a radiation beam and an objective lens, located in an optical path between the radiation source and the information layer, for converging the radiation beam to a spot on the information layer.

BACKGROUND OF THE INVENTION

There is a need for the production of optical record carriers of high capacity. Therefore, optical scanning devices using a relatively short wavelength radiation beam, for example a radiation beam of 400 nm, and a high numerical aperture (NA) objective lens system, with say NA>0.7 and for example NA=0.85, are desirable.

In a known optical scanning device providing a relatively high NA beam at the location of the optical disk being scanned, a compound objective lens is used to provide multiple-stage condensing of a generally collimated beam originating from the radiation source. In such a system, it is known to mechanically adjust the spacing of the two, or more, lens elements of the compound objective lens, in order to compensate for spherical aberrations generated by different optical path lengths (referred to herein as information layer depths) through which the beam travels in an optical disk to reach an information layer in the disk. Another method of compensation is by mechanically adjusting the position of the collimator lens with respect to the radiation source, so that the radiation beam impinges on the objective lens as a convergent, or divergent, instead of collimated, beam. Each of these methods alters the amount of spherical aberration generated in the optical system of the scanning device, to correctly cancel out that generated in the optical disk being scanned. A separate mechanical actuator is used to provide focus control to maintain focus of the beam to a spot on the information layer being scanned.

A known optical scanning device is described in U.S. Pat. No. 5,889,789. The device includes means for compensating spherical aberrations in the form of a controller, switchable between a setting for an optical disk having an information layer depth of 1.2 mm and a setting for an optical disk having an information layer depth of 0.6 mm. In one setting, a planar plate is inserted, by a mechanical actuator, into the optical path of the radiation beam. In the other setting, the planar plate is removed, by the mechanical actuator, from the optical path of the radiation beam.

However, using mechanical actuators to provide spherical aberration compensation, particularly when a separate mechanical actuator is used to provide focus control, is relatively complex and therefore increases the cost of manufacture of the scanning device.

It is possible to do without a spherical aberration compensation subsystem; however, it is necessary to maintain strict tolerances in the manufacture of optical disks used with the optical scanning device. Such tolerances are particularly strict when considering a device providing a relatively high NA scanning beam at the location of the optical disk. For example, an NA of 0.85 allows for a manufacturing tolerance in the information layer depth, which may be for example 0.1 mm, of approximately ±3 $\mu$m. By controlling such manufacturing tolerances, it is possible to use a rigid compound objective lens to provide a high NA scanning beam and no spherical aberration compensation subsystem. However, controlling manufacturing tolerances to such a degree has the consequence of increasing the cost of manufacture of the optical disks, and furthermore does not allow for spherical aberration compensation during the scanning of multi-layer optical disks.

A yet further known optical scanning device is described in JP-A-9306013, in which a radiation beam from a semiconductor laser is converted into a circular, parallel beam and passed through a twisted nematic liquid crystal cell which selectively rotates the polarization of incident light by 90°. The beam is then passed through a phase adjusting member, to reduce spherical aberrations for recording mediums having different substrate thicknesses, towards an objective lens which focuses the beam onto the recording medium. The phase adjusting member adjusts the phase differently in a central part than in a peripheral part, and must therefore be a relatively complex optical element.

SUMMARY OF THE INVENTION

In accordance with one aspect of the invention there is provided an optical scanning device for scanning an optical record carrier comprising an information layer, the device comprising a radiation source for generating a radiation beam and a compound objective lens, located in an optical path between the radiation source and the information layer, for converging the radiation beam to a spot on the information layer, the objective lens including at least a first lens element arranged to converge the beam to a certain convergence and a second lens element arranged to converge the beam to a greater convergence, wherein the device comprises a spherical aberration compensation optical subsystem including an electro-optical element for altering an optical path length in a spherical aberration generating region, which region is located in the optical path between the first lens element and the location of the record carrier in the device.

Spherical aberration compensation may be provided for information layers at various depths within an optical disk, or between optical disks, even in a relatively high numerical aperture device, without the need for a mechanical system to provide such spherical aberration compensation.

Further features and advantages of various embodiments of the invention will become apparent from the following description, given by way of example only, of preferred embodiments of the invention, which refers to the accompanying drawings, wherein:

BRIEF DESCRIPTION OF THE DRAWINGS

FIG. 1 is a schematic illustration of components common to a device in accordance with each of the first to fourth embodiments, to be described below, for scanning an optical record carrier 1. The record carrier 1 is for example an optical disk as will be described, by way of example, below.

DETAILED DESCRIPTION OF THE INVENTION

Figure 1:
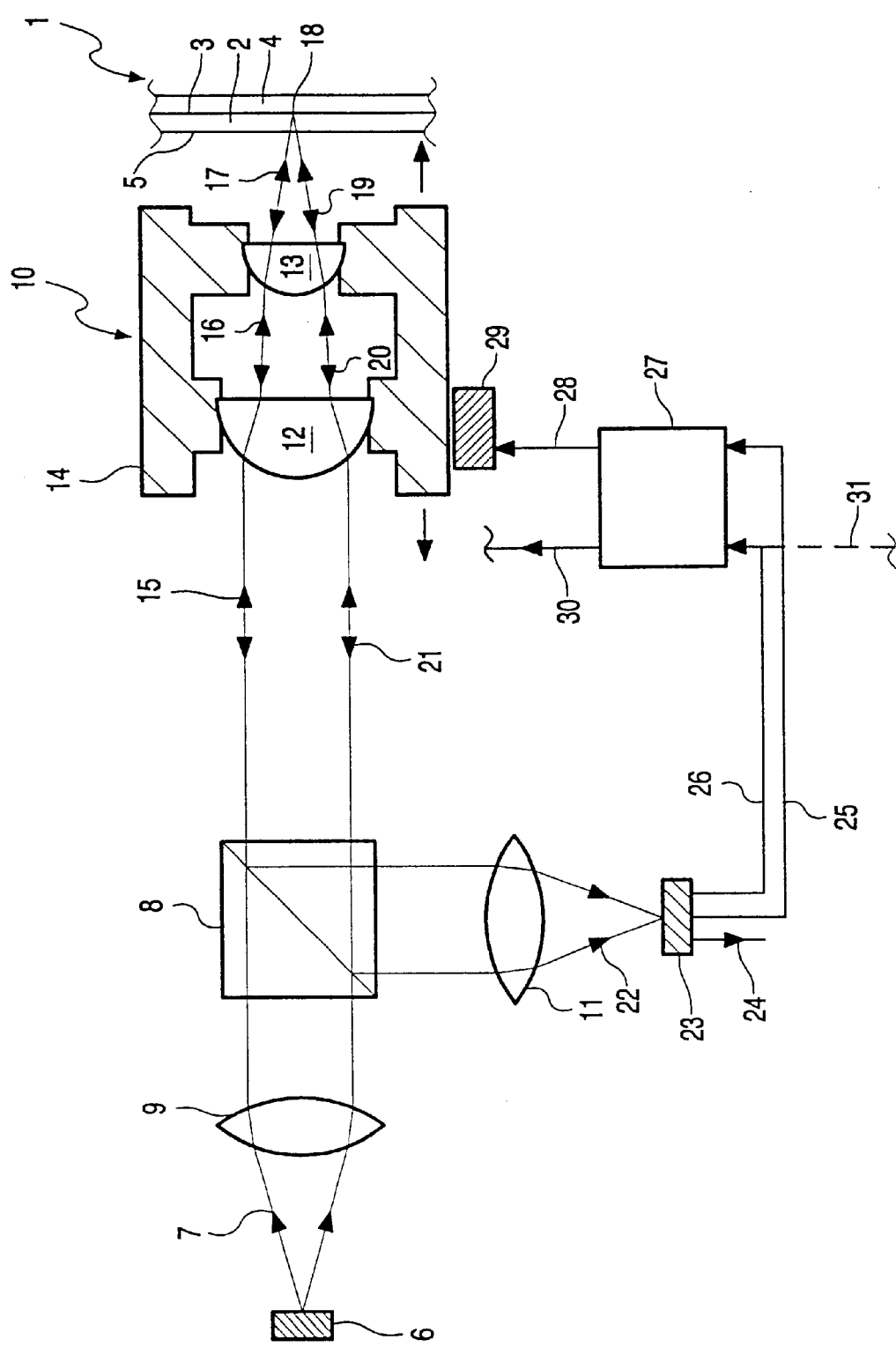
FIG. 1 is a schematic illustration of components common to a device in accordance with each of the first to fourth embodiments of the invention.

The optical disk 1 comprises a transparent layer 2, on one side of which at least one information layer 3 is arranged. In the case of a multi-layer optical disk, two or more information layers are arranged behind the transparent layer 2, at different depths within the disk. The side of the information layer, in the case of a multi-layer optical disk the layer furthest away from the transparent layer 2, facing away from the transparent layer is protected from environmental influences by a protection layer 4. The side of the transparent layer facing the device is the disk entrance face 5. The transparent layer 2 acts as a substrate for the optical disk by providing mechanical support for the information layer or layers. Alternatively, the transparent layer 2 may have the sole function of protecting the information layer 3, in the case of a multi-layer optical disk the uppermost information layer, while the mechanical support is provided by a layer on the other side of the information layer, for instance by the protection layer 4 or by a further information layer and transparent layer connected to the uppermost information layer.

Information may be stored in the information layer 3, or information layers, of the optical disk in the form of optically detectable marks arranged in substantially parallel, concentric or spiral tracks, not indicated in FIG. 1. The marks may be in any optically readable form, e.g. in the form of pits, or areas with a reflection coefficient or a direction of magnetization different from their surroundings, or a combination of these forms.

The scanning device includes a radiation source 6, for example a semi-conductor laser, emitting a diverging radiation beam 7. A beam splitter 8, for example a semi-transparent plate, reflects the radiation towards a lens system. The lens system includes a collimator lens 9, a compound objective lens 10 and a condenser lens 11. The compound objective lens 10 includes a first, or back, lens element 12 and a second, or front, lens element 13, fixed at a mutual relative spacing by a rigid mounting 14. Each of the lens elements 12, 13 is shown as a plano-convex lens, however other lens types such as convex-convex or convex-concave lenses may also be used.

The collimator lens 9 changes the diverging radiation beam 7 to a collimated beam 15. By collimated, we intend to mean a substantially parallel beam, for which the compound objective lens has a transverse magnification substantially equal to zero. The need for a collimated beam arises when optical elements in the collimated beam path are designed for use with an ideally collimated (parallel) beam. A collimated beam is not necessary when the elements in the beam path are designed for use with a divergent or convergent beam. Even using elements designed for use with an ideally collimated beam, a certain tolerance as to vergence of the beam is acceptable, depending on the efficiency required of the optical system. To achieve the efficiency desired of the present optical system, the collimated beam preferably has a vergence resulting in an absolute magnification of the objective lens smaller than 0.02.

The first lens element 12 of the objective lens 10 transforms the collimated radiation beam 15 into a converging beam 16 having an intermediate numerical aperture (NA), for example 0.55, and incident on the second lens element 13. The second lens element 13 changes the incident beam 16 into a converging beam 17, having a relatively high NA, for example 0.85, which comes to a spot 18 on the information layer 3.

Although the objective lens 10 is indicated in FIG. 1 as having two lens elements, it may comprise more elements, and may also comprise a hologram operating in transmission or reflection, or a grating for coupling radiation out of a waveguide carrying the radiation beam.

Radiation of the converging beam 17 reflected by the information layer 3 forms a diverging reflected beam 19, which returns on the optical path of the forward converging beam 17. The two elements of objective lens transform the reflected beam 19 first to a less divergent beam 20, then to a substantially collimated reflected beam 21, and the beam splitter 8 separates the forward and reflected beams by transmitting at least part of the reflected beam 21 towards the condenser lens 11.

The condenser lens transforms the incident beam into a convergent reflected beam 22 focused on detection systems, generally indicated by a single element 22 (in practice a plurality of detector elements may be used) in FIG. 1. The detection systems capture the radiation and convert it into electrical signals. One of these signals is an information signal 24, the value of which represents the information read from the information layer 3. Another signal is a focus error signal 25, the value of which represents the axial difference in height between the spot 18 and the information layer 3. Another signal is a spherical aberration error signal 26, which represents a deviation from a nominal amount of (unwanted) spherical aberration in the beam at the spot 18, and correspondingly a nominal amount of such spherical amount at the detector. Each of the signals 25, 26 are input to a focus servo and spherical aberration compensation controller 27. Alternatively, a separate controller may be used for each of the signals 25, 26.

The focus error signal 25 is used to generate a focus control signal 28 for a focus servo motor 29, which controls the axial position of the mounting 14, thereby controlling the axial position of the objective lens 10 such that the axial position of the spot 18 coincides substantially with the plane of the information layer 3 in the area of the spot. Part of the detection systems, including one or more radiation-sensitive detection elements, may be used to directly sense radiation to generate output signals representing a focus error amount, which output signals are processed by an electronic circuit to generate the focus error signal 25.

The spherical aberration error signal 26 may be derived in a number of ways, including by direct measurement of the spherical aberration in radiation arriving at the detection systems 23, as shown in FIG. 1. In this case, part of the detection systems, including one or more radiation-sensitive detection elements and an electronic circuit processing the output signals of the detection elements, may be used for generating the spherical aberration error signal 26. Such a system is described in our co-pending European patent application no. 98204477.8. Alternatively, the spherical aberration error signal 26 may be a jitter optimization signal derived from values representing the jitter in a plurality of information signals which are generated from two or more radiation-sensitive detection elements with different spherical aberrations introduced in their receiving optical paths. Alternatively, or additionally, another signal may be input into the controller 27, namely a spherical aberration selection signal 31. The spherical aberration selection signal 31 represents a known and discrete depth of the information layer 3 in the optical disk 1, for which may for example be detected by optically or mechanically detecting the type of optical disk inserted into the optical scanning device, or by a user selecting the type of disk inserted into the optical scanning device.

An unwanted spherical aberration represented by the spherical aberration error signal 26 or the spherical aberration selection signal 31, which arises when the radiation beam has to be focused through a depth of the optical disk which is thicker or thinner than a thickness for which the objective lens is currently adjusted, is compensated for by a spherical aberration compensation optical subsystem. This subsystem includes an electro-optical device, located in the optical path between the beam splitter 8 and the optical disk 1. The spherical aberration compensation optical subsystem is not illustrated in FIG. 1, but will be described hereinafter in relation to each of the first to fourth embodiments. A spherical aberration control signal 30, derived from spherical aberration compensation signal 26 and/or the spherical aberration selection signal 31, controls the above-mentioned electro-optical device in each of the first to fourth embodiments to be described hereinafter.

In order to increase the information reading efficiency of the arrangement, in each of the first to fourth embodiments as will be described hereinafter, a polarization modifying optical element, generating a circularly polarized beam from a linearly polarized beam, and a linearly polarized beam from a circularly polarized beam, for example a quarter wavelength plate, is preferably present in the optical path at a location in the optical path between the beam splitter 8 and the optical disk 1. The preferred positioning of the optical plate will be described hereinafter in relation to each of the first to fourth embodiments. The beam splitter 8 is then preferably a polarizing beam splitter which acts in combination with the polarization modifying optical element to ensure a greater output efficiently from the beam splitter 8 towards the detector 23.

In the following descriptions of each of the first to fourth embodiments, it is to be appreciated that the above discussion relating to FIG. 1 is intended to apply thereto, and that the components present, or modifications thereof as described in relation to FIG. 1, are intended to be included in each of the first to fourth embodiments.

Figure 2:
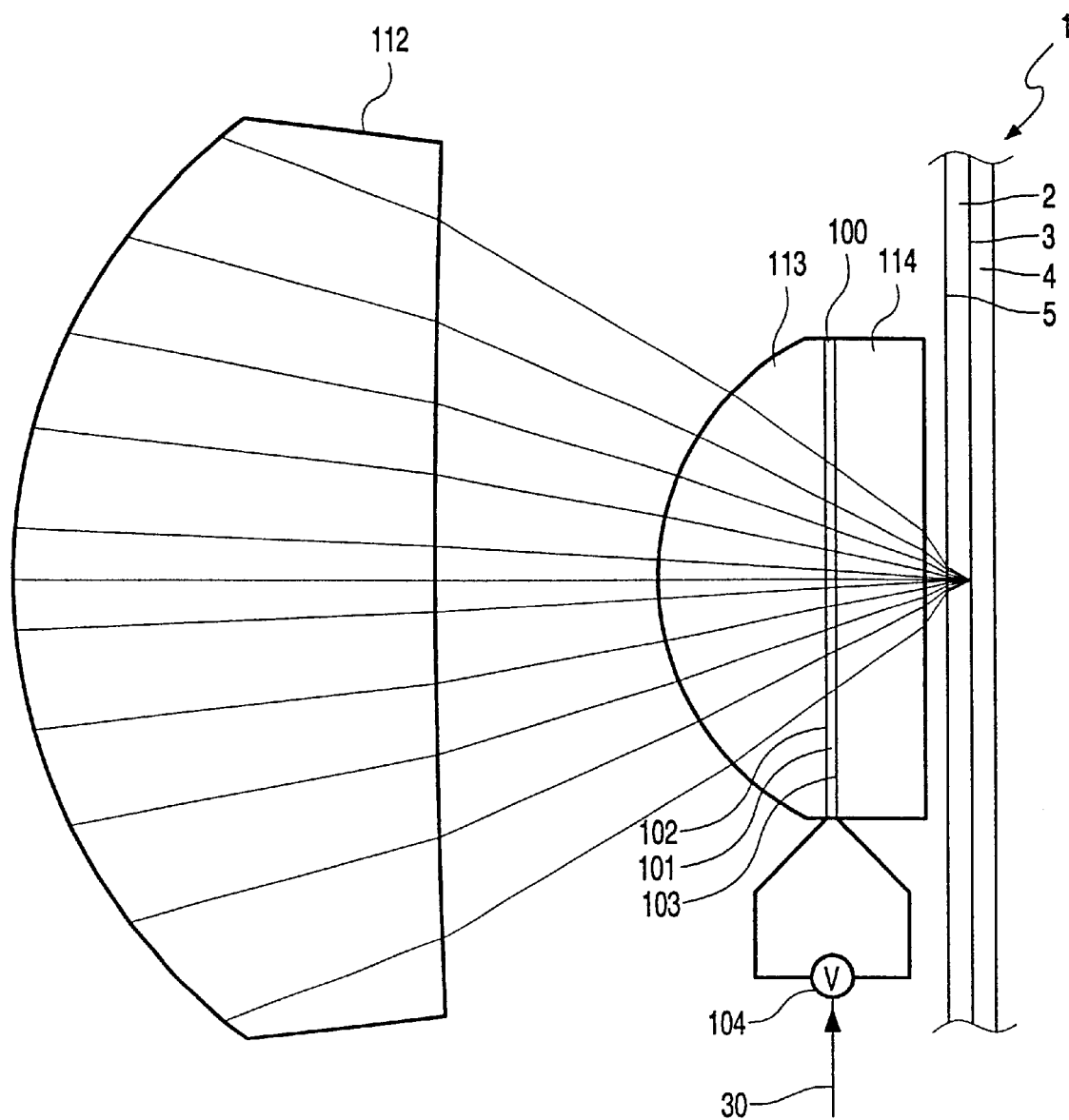
FIG. 2 is a schematic illustration of a first embodiment of the invention.

Referring now to FIG. 2, in the first embodiment of the invention, the electro-optical element of the spherical aberration compensation optical subsystem is a liquid crystal cell 100 formed between two parallel planar surfaces located in a plane perpendicular to the optical axis of a rigid compound objective lens which includes a back lens element 112 and a front lens element 113. The liquid crystal cell 100 is located between the front lens element 113 and the entrance face 5 of the optical disk 1.

The amount of space between the front lens element 113 and the entrance face 5 is relatively limited and therefore the liquid crystal cell 100 is preferably located between a surface of the front lens element 113, which is a plano-convex lens, and a surface of a transparent planar plate located adjacent its planar surface. Each of these two planar surfaces includes a conductive transparent layer 102, 103 forming the electrodes of the liquid crystal cell 100. Layers 102, 103 may for example be formed from Indium Tin Oxide (ITO). The conductive transparent layers 102, 103 bound a liquid crystal layer 101. The liquid crystal cell 100 is connected to a variable voltage source 104, which applies a voltage to the conductive transparent layers, which voltage is controlled by the aspherical aberration control signal 30 provided by the controller 27.

By varying the voltage applied by the variable voltage source 100, the refractive index of the liquid crystal layer 101 may be gradually altered. In the fully-off-state, the liquid crystal molecules are arranged generally in the plane of the liquid crystal layer, and in the fully-on-state, the liquid crystal molecules are arranged generally in the axial direction of the optical system. A typical refractive index of a liquid crystal cell is $n_{lc}=1.5$, and a typical maximum variation in the refractive index of the liquid crystal material in the liquid crystal cell 100 is $\Delta n_{lc}=0.25$. Smaller variations may be achieved by applying smaller voltages to the cell.

Thus, first by selecting an appropriate thickness of the liquid crystal cell 100 and applying a suitable voltage, a desired optical path length may be set for the liquid crystal cell 100. The amount of spherical aberration generated in the liquid crystal cell 100 changes with the optical path length of the cell. Thus, desired variations in the spherical aberration of the radiation impinging on the optical disk 1 may be generated in the liquid crystal cell 100 by varying the applied voltage, whereby any otherwise uncompensated spherical aberrations generated in the optical disk as the radiation beam travels towards the information layer, may be compensated for.

The liquid crystal layer thickness required depends upon the range in information layer depths for optical disks which the apparatus is intended to compensate for. For example, for a range in information layer depth $\Delta d_{il}$ of 5 μm, the thickness $d_{lc}$ of the liquid crystal layer 101 should be in the region of 125 μm. The range in information layer depth which may be accommodated, when NA=0.85 (NA being the numerical aperture of the beam between the front lens element 113 and the optical disk 1), $n_{tl}=1.58$ ($n_{tl}$ being the refractive index of the transparent layer, or in the case of a lower information layer of a multi-layer disk, the effective refractive index of the stratified part of the disk above the information layer), $n_{lc}=1.5$ and $\Delta n_{lc}=0.25$, is given by the following equation:

$$\Delta d_{il}=0.046 d_{lc}(NA/NA_d)^4$$

where $NA_d$ is the numerical aperture of the beam inside the optical disk.

In this first embodiment of the invention, a polarization modifying element, such as a quarter wavelength plate, may be located between the liquid crystal cell 100 and the entrance face 5 of the optical disk 1, which in combination with the use of a polarizing beam splitter, as described above, improves the efficiency of the detection system.

In order to increase the response speed of the spherical aberration compensation optical subsystem, the liquid crystal cell 100 may be split into two separate liquid crystal cells providing a total liquid crystal layer thickness equal to that of the single cell 100. The two preferably have approximately equal thicknesses. The response time of a liquid crystal cell varies as the square of the thickness of the liquid crystal layer, and therefore splitting the crystal cell 100 into two significantly increases the response speed of the spherical aberration compensation optical subsystem.

Since in this embodiment the liquid crystal cell 100 is located in a part of the beam incident upon, and reflected from, the optical disk 1 with a relatively high NA, for example 0.85, a relatively high variation in spherical aberration of the beam, both at the information layer 3 and at the detector 23, can be generated by varying the voltage applied across the electrodes.

Figure 3:
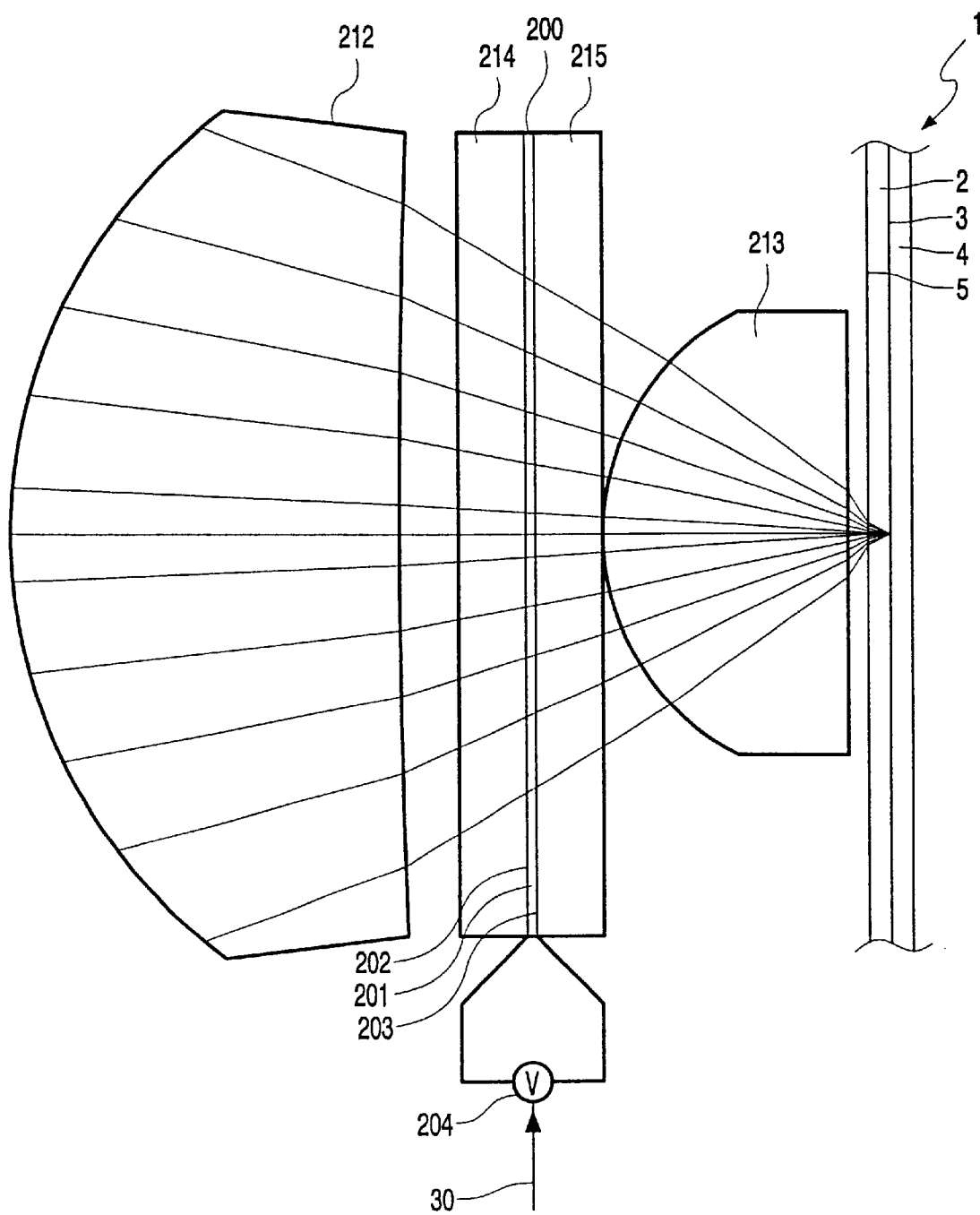
FIG. 3 is a schematic illustration of a second embodiment of the invention.

Referring now to FIG. 3, in the second embodiment of the invention the electro-optical element of the spherical aberration subsystem is a liquid crystal cell 200 located between the back lens element 212 and the front lens element 213 of a rigid compound objective lens.

In the arrangement shown in FIG. 3, the liquid crystal cell 200 is located between two transparent planar plates 214, 215. The opposing surfaces of the transparent plates 214, 215 are parallel and planar and arranged perpendicular to the optical axis of the rigid compound objective lens.

The liquid crystal cell 200 is formed of a liquid crystal layer 201 bounded by two conductive transparent layers 202, 203 formed on the opposing surfaces of the transparent plates 214, 215. The conductive transparent layers 202, 203 may for example be formed of an ITO material. The liquid crystal cell 200 is connected to a variable voltage source 204 of which the voltage is controlled by the aspherical aberration control signal 30 generated by the controller 27.

In the second embodiment, the liquid crystal cell 200 is located in the part of the incident and reflected beams which is of an intermediate NA, for example 0.55. The amount of spherical aberration variation which may be generated in the liquid crystal cell 200 itself is therefore relatively small compared to the spherical aberration generated in the liquid crystal cell 100 of the first embodiment described above. However, an additional effect is that variation of the refractive index of the liquid crystal layer 201 under control of the variable voltage source 204 has the further, and more influential, effect of altering the apparent optical path between the back lens element and the front lens element 213. Put in another way, the object distance of the front lens element 213 is modified by variations in the refractive index of the liquid crystal layer 201. Compared to the arrangement of the first embodiment, the combination of the two effects, and in particular the latter effect, leads to the generation by means of the liquid crystal cell 200 of variations in the spherical aberration of the incident beam, and correspondingly the reflected beam, which are approximately twice as large as those which can be generated by means of the arrangement of the first embodiment, for a liquid crystal cell of the same thickness.

Thus, in this second embodiment, the response speed of the spherical aberration compensation optical subsystem, which varies as the square of the thickness of the liquid crystal layer 201 of the cell, may be significantly reduced compared with the arrangement of the first embodiment when providing the same range of variations in the information layer depths of optical disks which may be accommodated by the system.

For example, for a range in information layer depth $\Delta d_{il}$ of 5 μm, the thickness $d_{lc}$ of the liquid crystal layer 201 should be in the region of 65 μm. This corresponds to a response time for switching the liquid crystal cell 200 of approximately 4 seconds. As a further example, for variation in information layer depth $\Delta d_{il}$ (between optical disks, or possibly in a multi-layer optical disk) of 10 μm, a total liquid crystal cell thickness $d_{lc}$ of approximately 130 μm is required. By providing two separate liquid crystal cells between the back lens element 212 and the front lens element 213, a response time for switching of the cells can however be maintained at approximately 4 seconds.

Providing the front lens element 213 fulfils the Abbe condition, which we assume in the case of the present embodiment, the range in information layer depth which may be accommodated is given by the following equation:

$$\Delta d_{il} = -\frac{(1-\beta^2)\beta^2 n_{il}^2}{(1-n_{il}^2)n_{lc}^2} d_{lc} \Delta n_{lc}$$

Where β is the magnification of the front lens element 213.

In order to provide a suitable range in information layer depth which may be accommodated, the magnification of the front lens element 213 preferably falls within the following range:

$0.125 < \beta^2 < 0.875$

The range is maximized with $\beta^2 = 0.5$, and a practical value is given by $$\beta \approx \frac{1}{n_{il}}.$$

With $n_{il} = 1.58$, $\beta \approx 0.633$ ($\beta^2 \approx 0.4$).

Again, in order to increase the response speed of the spherical aberration compensation optical subsystem, the liquid crystal cell 200 may be split into two separate liquid crystal cells, providing a total liquid crystal layer thickness equal to that of the single liquid crystal cell 200, with each located between the back lens element 212 and the front lens element 213, in order to generate the same amount of spherical aberration alteration.

Furthermore, to increase the information reading efficiency, a polarization rotating optical plate, such as a quarter wavelength plate, may be placed between the liquid crystal cell, or cells, and the location of the optical disk 1.

It should be mentioned that, whilst in the embodiment illustrated in FIG. 3 a gap is provided between the back lens element 213 and the adjacent plate 214 of the liquid crystal cell 200, in a further embodiment the transparent plate 214 may be dispensed with, by arranging the back lens element to define one surface of the liquid crystal cell 200, similar to the manner in which the front lens element 114 defines one surface of the liquid crystal cell 100 in the first embodiment.

The arrangement of the first and second embodiments of the invention may be used to compensate for variations in the thickness of the transparent layer 2, within manufacturing tolerances (for example, ±5 μm), of optical disks 1 which are accommodated within the optical scanning device.

In each of the first and second embodiments described above, the response of the spherical aberration compensation optical subsystem is continuously modifiable to compensate for a continuous range of information layer depths in the optical disks which the device is intended to accommodate. However, the spherical aberration compensation optical subsystems exhibit a relatively long response time.

In the third and fourth embodiments of the invention, to be described below, the spherical aberration compensation optical subsystem is switchable between two distinct states, to accommodate two predetermined information layer depths in the optical disks which the device is intended to accommodate. The response speed of the spherical aberration compensation optical subsystem is increased, for a given range in the information layer depths of the optical disks to be accommodated.

Figure 4A:
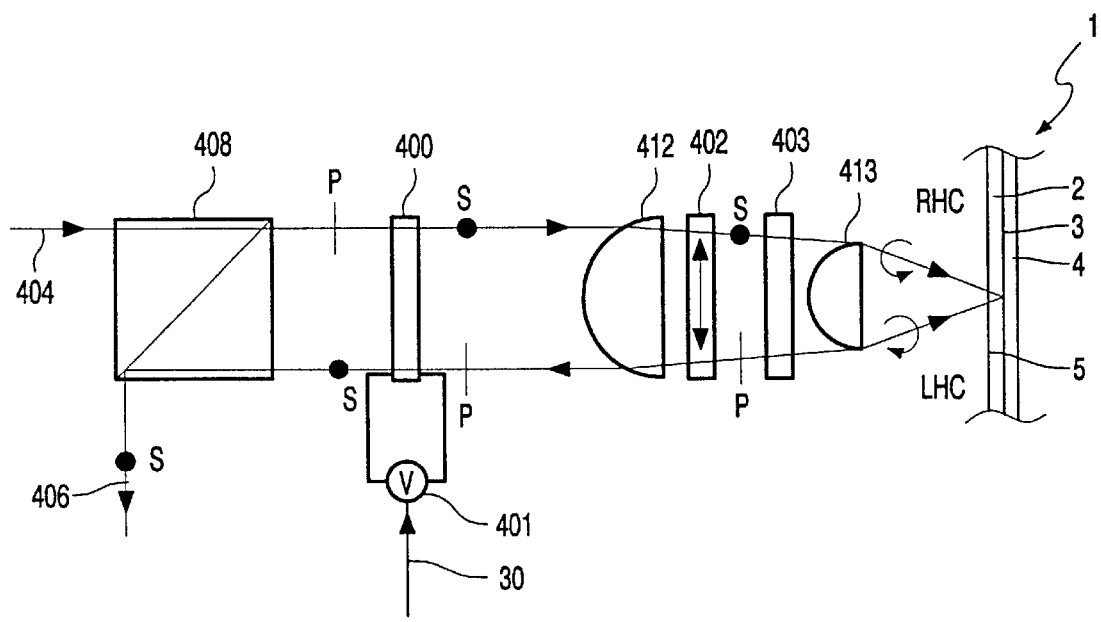
FIG. 4 is a schematic illustration of a third embodiment of the invention.
Figure 4B:
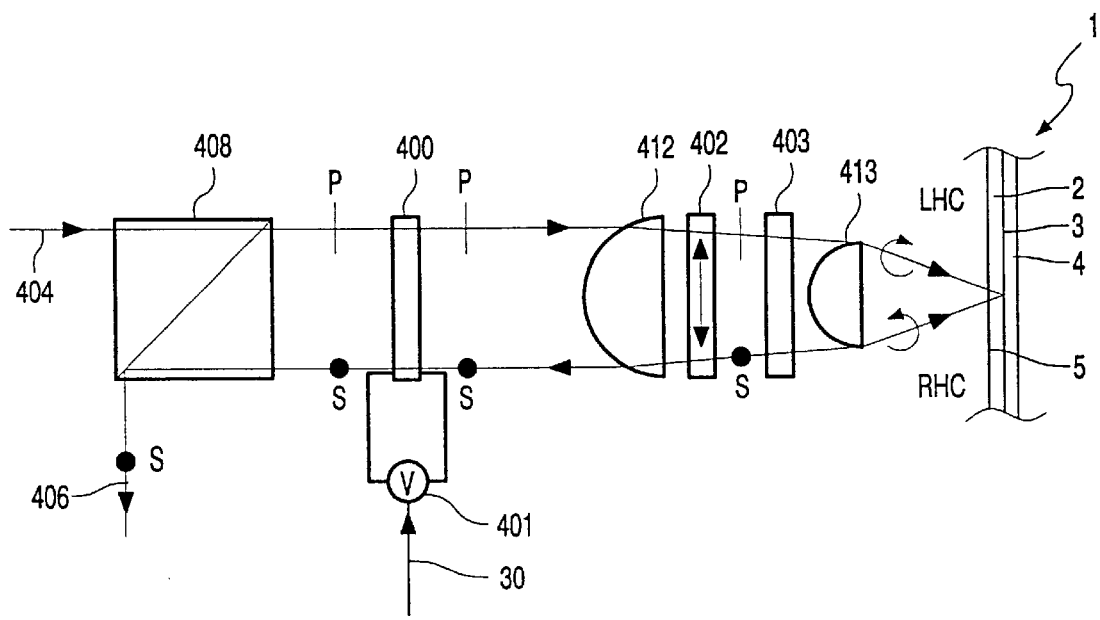

Referring now to FIGS. 4(A) and 4(B), in the third embodiment of the invention, the electro-optical device of the spherical aberration compensation optical subsystem is a Twisted Nematic (TN) liquid crystal cell 400. The TN cell 400 is a planar cell, consisting of a liquid crystal layer interposed between two transparent planar plates having conductive transparent layers formed on the inner surfaces thereof, forming the electrodes of the TN liquid crystal cell 400. As is known in the art of TN liquid crystal cells, in addition to the electrode layers, the surfaces of the electrodes adjacent the liquid crystal layer are coated with a director material. The director at one side of the liquid crystal cell 400 directs the liquid crystal molecules in an orientation which is perpendicular to the direction of orientation with which the director on the other side of the liquid crystal cell directs the liquid crystal molecules. Accordingly, a 90° twist is formed in the bulk of the liquid crystal layer, between the two sides of the liquid crystal cell, when the cell 400 is in an off-state. The liquid crystal cell 400 is connected to a voltage source 401 which is controlled by the spherical aberration control signal 30.

When switched on, the voltage source 401 switches the liquid crystal cell 400 into an on-state, in which the liquid crystal molecules are aligned generally parallel to the optical axis of the rigid compound objective lens formed by a front lens element 413 and a back lens element 412. Accordingly, in the off-state of the liquid crystal cell 400, the polarization of the incident radiation is rotated through 90° when passing through the liquid crystal cell 400. Conversely, in the off-state, the liquid crystal cell 400 has no effect on the polarization of the radiation passing through the cell 400.

The thickness $d_{lc}$ of the liquid crystal layer in the TN liquid crystal cell 400 is relatively thin, at 4–6 μm. The response speed of the spherical aberration compensation optical subsystem is correspondingly fast, with the cell switching between on and off states within 10–50 ms.

A further component of the spherical aberration compensation optical subsystem in the third embodiment is a passive linear birefringent planar plate 402, preferably located in the optical path between the back lens element 412 and the front lens element 413 where the beam has an intermediate numerical aperture, for example approximately 0.55, so as to exhibit the relatively large spherical aberration generating effect explained in relation to the second embodiment. However, the birefringent plate may also be located between the front lens element 413 and the entrance face 5 of the optical disk 1, to exhibit the effect explained in relation to the first embodiment. The refractive index of the birefringent plate 402 varies, by $\Delta n = n_o - n_e$ with the polarization of the incident radiation. The refractive index of the birefringent plate is $n_o$ when the polarization of the incident radiation is perpendicular to the optic axis of the birefringent plate 402, whereas the refractive index is $n_e$ when the polarization of the incident radiation is parallel to the optic axis of the birefringent plate 402. The birefringent plate 402 may for example be formed of calcite.

Thus, in the third embodiment, the amount of spherical aberration generated in the birefringent plate 402, which is dependent upon the optical path length in the plate, is variable between two discrete amounts, by switching the TN liquid crystal cell 400.

A polarization modifying element 403, such as a quarter wavelength plate, is preferably interposed between the birefringent plate 402 and the entrance face 5 of the optical disk 1, in order to improve the information reading efficiency of the scanning device. As shown in FIGS. 4(A) and 4(B), the polarization-modifying plate is preferably located between the birefringent plate 402 and the front lens 413. Whilst the TN liquid crystal cell 400 is shown as a separate component in FIG. 4, it should be mentioned that the cell 400 may be integrated with another component, for example the birefringent plate 402.

Referring now to FIG. 4(A) which illustrates the TN liquid crystal cell 400 in an off-state, an incident beam, indicated at 404, generated by the radiation source 6, first passes through the polarizing beam splitter 408 having a P-type polarization. On passing through the TN liquid crystal cell 400, the polarization of the incident beam is rotated to an S-type polarization. The incident beam is condensed to a certain degree through the back lens element 412 and passes through the birefringent plate 402, the birefringent plate exhibiting a refractive index of no in this case since, as shown in FIG. 4(A) the optic axis of the birefringent plate 402 is arranged in the P-direction. On then passing through the quarter wavelength plate 403, the polarization of the incident beam is modified to a right-handed circular polarization, and the incident beam is condensed further by the front lens element 413. On being reflected from the information layer 3 in the optical disk 1, the polarization of the reflected beam is modified to a left-handed circular polarization, which on passing through the quarter wavelength plate 403 is modified to a P-type polarization.

On passing through the birefringent plate 402, the reflected beam experiences a refractive index of $n_e$, and on passing through the off-state TN liquid crystal cell 400 the P-type polarization is modified to an S-type polarization by the 90° rotation effect of the TN liquid crystal cell 400. The polarizing beam splitter 408 reflects the majority of the reflected beam, in its S-type polarization state towards the reflector in the beam indicated at 406.

Referring now to FIG. 4(B), the discussion relating to FIG. 4(A) applies, however in this case the TN liquid crystal cell 400 is switched to an on-state by the spherical aberration control signal 30. Thus, the polarization of the radiation incident on the liquid crystal cell 400 is unaffected by its passage through the cell 400. Accordingly, the beam when passing through the birefringent plate 402 remains in a P-type polarization state and experiences a refractive index of $n_e$, thereby generating a different amount of spherical aberration to the amount of spherical aberration generated in the off-state of the TN liquid crystal cell 400 described in relation to FIG. 4(A). Correspondingly, when the reflected beam passes through the birefringent plate 402, the beam is in an S-type polarization state, and experiences a refractive index of $n_o$, again generating a different amount of spherical aberration to that generated when the TN liquid crystal cell 400 is in an off-state. When the reflected beam meets the polarizing beam splitter 408 the reflected beam is in an S-type polarization, and the polarizing beam splitter 408 reflects the majority of the beam towards the detector 23.

Switching the TN liquid crystal cell 400 thus creates a difference in the spherical aberration of the beam incident upon the optical disk, and therefore is useful for modifying the spot size of the focused spot on the information layer 3 of the optical disk. A greater resolution can thus be obtained at the optical disk, thereby to read data pits or other markings on the optical disk more efficiently, even where two different depths of information layer are required to be read by the scanning device, for example in a multi-layer optical disk 1.

It will be appreciated that the total amount of spherical aberration generated in both directions of travel of the radiation beam through the birefringent plate 402 in the on-state of the TN liquid crystal cell 400 and the off-state of the TN liquid crystal cell 400 is in each case the same. The optical path through the birefringent plate is, in the off-state case, $dn_o$ (d being the thickness of the birefringent plate) when the beam travels towards the optical disk 1 and $dn_e$ when the beam is reflected from the optical disk 1, and in the on-state case, vice versa. The spot size of the focused spot at the detector is thus unmodified by the switching of the TN liquid crystal cell 400.

Variations in the spot size of the focused spot at the detector are however caused by the variations in spherical aberration generated by the different information layer depths. These variations may be compensated for by providing an appropriate optical compensation system at the detector and/or by varying the processing of the electrical signals generated by detector elements in the detector 23.

Figure 5A:
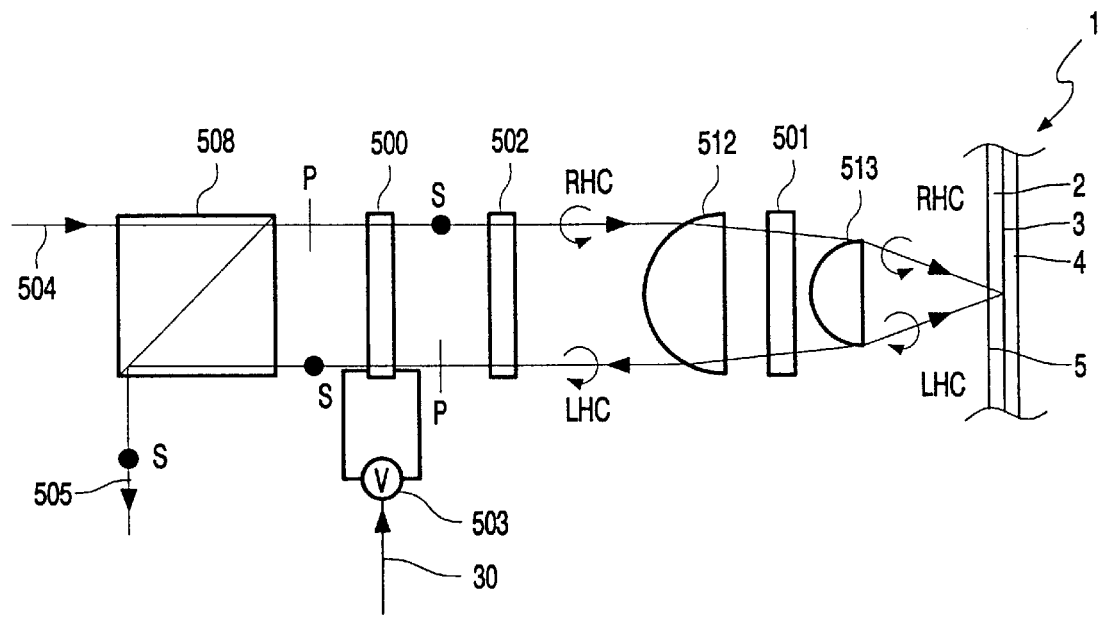
FIG. 5 is a schematic illustration of a fourth embodiment of the invention.
Figure 5B:
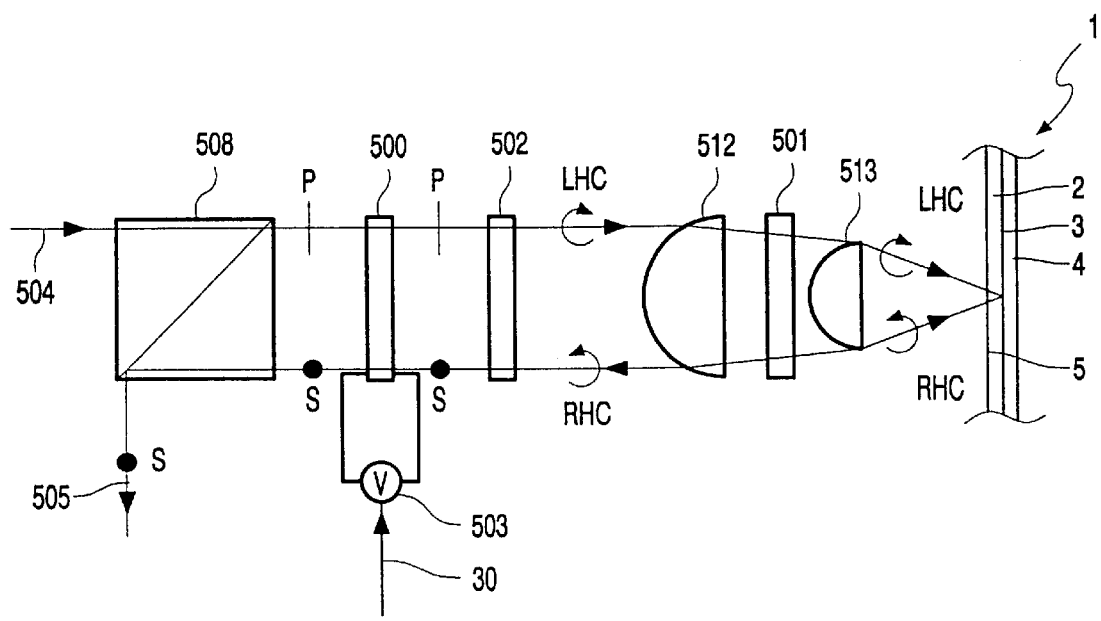

FIGS. 5(A) and 5(B) illustrate a fourth embodiment of the invention, in which the electro-optical element of the spherical aberration compensation optical subsystem is a TN liquid crystal cell 500, similar to that described in relation to the third embodiment. The TN liquid crystal cell 500 is switched by means of a voltage source 503, controlled by the spherical aberration control signal 30. However, in the fourth embodiment the subsystem includes a passive circular birefringent plate 501. A preferred example of the circular birefringent plate 501 is a passive liquid crystal cell containing cholesteric liquid crystal. Such a cholesteric liquid crystal is optically active, and provides a relatively large circular birefringence $\Delta n_l = n_{lo} - n_{le}$. By choosing such a material, the thickness of the circular birefringent plate 501 may be reduced compared to other less optically active materials.

In addition, in the fourth embodiment, a polarization modifying plate, such as a quarter wavelength plate 502, is located in the optical path between the TN liquid crystal cell 500 and the circular birefringent plate 501. The circular birefringent plate is located in the optical path between the quarter wavelength plate 502 and the entrance face 5 of the optical disk 1.

In a preferred embodiment, as shown in FIGS. 5(A) and 5(B), the polarization modifying plate 502 is located between the TN liquid crystal cell 500 and the back lens element 512 of the rigid compound objective lens. The TN liquid crystal cell 500 is located between a polarizing beam splitter 508 and the polarization modifying plate 502. Whilst the TN liquid crystal cell 500 is shown as a separate component in FIG. 5, it should be mentioned that the cell 500 may be integrated with another component, for example the polarization modifying plate 502.

The circular birefringent plate 501 is preferably located between the back lens element 512 and a front lens element 513 of the rigid compound objective lens, so as to exhibit the relatively large spherical aberration generating effect explained in relation to the second embodiment. However, the circular birefringent plate 501 may also be located between the front lens element 513 and the entrance face 5 of the optical disk 1, to exhibit the effect explained in relation to the first embodiment.

Referring now to FIG. 5(A), when the TN liquid crystal cell 500 is in an off-state, the incident beam passing through the polarizing beam splitter 508 and arriving from the radiation source as indicated at 504 experiences a 90° rotation in polarization from the P-type to S-type state when passing through the TN liquid crystal cell 500.

The polarization modifying plate 502 modifies the polarization of the incident beam to a right-handed circular polarization, and accordingly the beam when passing through the circular birefringent plate 501 experiences a refractive index of $n_{lo}$. When the beam is reflected by the information layer 3 of the optical disk 1, the polarization of the beam is altered to a left-handed circular polarization and accordingly the reflected beam experiences a refractive index of $n_{le}$ when passing through the circular birefringent plate 501. The polarization modifying plate 502 converts the left-handed circular polarization to a P-type linear polarization in the reflected beam, and the TN liquid crystal cell 500 modifies the polarization to an S-type linear polarization.

The polarizing beam splitter 508 accordingly reflects the majority of the beam towards the reflector, as indicated at 505.

FIG. 5(B) illustrates the spherical aberration compensation optical subsystem in an on-state of the TN liquid crystal cell, whereby the polarization of the linearly-polarized radiation is not modified on passing through the TN liquid crystal cell 500. Accordingly, the incident beam on passing through the circular birefringent plate 501 experiences a refractive index of $n_{le}$, and the reflected beam on passing through the circular birefringent plate 501 experiences a refractive index of $n_{lo}$.

Switching the TN liquid crystal cell 500 thus creates a difference in the spherical aberration of the beam incident upon the optical disk, and therefore is useful for modifying the spot size of the focused spot on the information layer 3 of the optical disk. A greater resolution can thus be obtained at the optical disk, thereby to read data pits or other markings on the optical disk more efficiently, even where two different depths of information layer are required to be read by the scanning device, for example in a multi-layer optical disk 1.

It will be appreciated that the total amount of spherical aberration generated in both directions of travel of the radiation beam through the circular birefringent plate 501 in the on-state of the TN liquid crystal cell 500 and the off-state of the TN liquid crystal cell 500 is in each case the same. The optical path through the birefringent plate is, in the off-state case, $d_l n_{lo}$ ($d_l$ being the thickness of the birefringent plate) when the beam travels towards the optical disk 1 and $d_l n_{le}$ when the beam is reflected from the optical disk 1, and in the on-state case, vice versa. The spot size of the focused spot at the detector is thus unmodified by the switching of the TN liquid crystal cell 500.

Variations in the spot size of the focused spot at the detector are however caused by the variations in spherical aberration generated by the different information layer depths. These variations may be compensated for by providing an appropriate optical compensation subsystem at the detector and/or by varying the processing of the electrical signals generated by detector elements in the detector 23.

It will be appreciated that the present invention allows for the reading of an optical disk of high capacity, using a relatively low wavelength radiation beam, for example a radiation beam of approximately 400 nm wavelength, using a high numerical aperture beam at the optical disk, and without using a mechanical actuator to effect spherical aberration compensation, even for varying depths of information layer in the optical disks being read.

It will be appreciated that, whereas the above-described embodiments all relate to the reading of data from an optical disk, the present invention may equally be applied in relation to the optical recording of data on a record carrier.

Other variations and modifications are envisaged within the scope of the invention, which is defined by the accompanying claims.

Whilst in each of the first to fourth embodiments described above, a variable spherical aberration is generated by a planar optical plate or element of uniform thickness and a substantially uniform birefringence, the variable spherical aberration may also be generated in an optical plate or element having at least one non-planar surface, for example a surface shaped according to the $A_{40}$ Zernike polynomial. However, this increases manufacturing complexity for the device.

Whilst in the third and fourth embodiments described above, a TN liquid crystal cell is used to selectively rotate the polarization of the incident radiation through 90°, similar (but less optimal in terms of complexity and the efficiency of the optical system) functionality could be provided by dispensing with the polarization rotating element and instead using either a single radiation source emitting radiation at an orientation of 45° to the axis of birefringence and/or the beam splitter, or two separate radiation sources emitting orthogonally-polarized radiation at each of the required polarizations. The required spherical aberration compensation can then be selected, in accordance with a selection control signal, for example by a switchable polarization-selective filter at the detector. Alternatively, in the case of providing two such separate radiation sources, the sources may be selectively energized in accordance with the selection control signal.

Finally, arrangements combining the spherical aberration compensation optical subsystem of one of the first and second embodiments with that of one of the third or fourth embodiments are envisaged. Such combinations would be useful in order to provide spherical aberration compensation for both discrete variations in the information layer depths of multi-layer optical disks, and for continuous variations, within given manufacturing tolerances, in the information layer depths of different optical disks.

What is claimed is:

1. An optical scanning device for scanning an optical record carrier having an information layer, the device comprising:
   a radiation source for generating a radiation beam;
   a compound objective lens, located in an optical path between the radiation source and the information layer, for converging the radiation beam to a spot on the information layer, the objective lens including at least a first lens element arranged to converge the beam to a certain convergence and a second lens element arranged to converge the beam to a greater convergence; and
   a spherical aberration compensation optical subsystem including an electro-optical element for altering an optical path length in a spherical aberration generating region, which region is located in the optical path between the first lens element and the information layer of the record carrier.

2. An optical scanning device according to claim 1, wherein the spherical aberration generating region is located between the first lens element and the second lens element.

3. An optical scanning device according to claim 1, wherein the electro-optical element is located between the second lens element and the location of the record carrier.

4. An optical scanning device according to claim 3, wherein the electro-optical element is defined in part by one surface of the second lens element.

5. An optical scanning device according to claim 1, wherein the electro-optical element is located between the radiation source and the first lens element.

6. An optical scanning device according to claim 1, wherein the electro-optical device comprises a liquid crystal cell.

7. An optical scanning device according to claim 1, wherein the electro-optical element is an optical element switchable between a first state, in which the polarization of light exiting the element has a first orientation relative to a predetermined polarization of light entering the element, and a second state in which the polarization of light exiting the element has a second orientation relative to said predetermined polarization, the first and second orientations being substantially orthogonal.

8. An optical scanning device according to claim 1, wherein the spherical aberration compensation optical subsystem includes a passive birefringent optical element located in said spherical aberration generating region.

9. An optical scanning device according to claim 8, wherein the birefringent optical element is in the form of a planar optical plate having a substantially uniform birefringence throughout.

10. An optical scanning device according to claim 8, wherein the birefringent optical element is a linear birefringent optical element.

11. An optical scanning device according to claim 10, further comprising an optical element, having the effect of a quarter wavelength plate, located between the linear birefringent element and the location of the record carrier.

12. An optical scanning device according to claim 8, wherein the birefringent element is a circular birefringent optical element.

13. An optical scanning device according to claim 12, further comprising an optical element, having the effect of a quarter wavelength plate, located between the circular birefringent optical element and the electro-optical element in the optical path.

14. An optical scanning device according to claim 1, wherein the optical characteristics of the electro-optical element are controlled in response to a spherical aberration error detected in radiation impinging upon a detector of the optical scanning device.

15. An optical scanning device according to claim 1, wherein the optical characteristics of the electro-optical element are altered under control of a selection signal selectively indicating one of at least two discrete information layer depths to be scanned.

16. An optical scanning device according to claim 1, wherein the first and second lens elements are rigidly mounted in relation to one another, such that the mutual spacing between the first and second optical elements is fixed.

17. An optical scanning device according to claim 1, wherein the device further comprises a focusing subsystem for altering the axial distance between the compound objective lens and the location of the optical disk, the focusing subsystem moving the first and second lens elements in unison and to the same extent.

18. An optical scanning device according to claim 1, wherein the beam emerging from the second lens element is arranged to impinge on the record carrier with a numerical aperture greater than 0.7.

19. A method of operating an optical scanning device comprising:
   providing an optical scanning device including:
      a radiation source for generating a radiation beam;
      a compound objective lens, for positioning in an optical path between a radiation source and an information layer of an optical record carrier, for converging a radiation beam to a spot on the information layer, the objective lens including at least a first lens element arranged to converge the beam to a certain convergence and a second lens element arranged to converge the beam to a greater convergence; and
      a spherical aberration compensation optical subsystem including an electro-optical element for altering an optical path length in a spherical aberration generating region, which region is located in the optical path between the first lens element and the information layer of the record carrier; and
   the method further comprising:
      reading an information layer of the record carrier during a scanning operation; and
      altering the optical characteristics of the optical subsystem during the scanning operation in order to compensate for a spherical aberration generated in the record carrier.

20. A method of operating an optical scanning device comprising:
   providing an optical scanning device including:
      a radiation source for generating a radiation beam;
      a compound objective lens, for positioning in an optical path between a radiation source and an information layer of an optical record carrier, for converging a radiation beam to a spot on the information layer, the objective lens including at least a first lens element arranged to converge the beam to a certain convergence and a second lens element arranged to converge the beam to a greater convergence; and a spherical aberration compensation optical subsystem including an electro-optical element for altering an optical path length in a spherical aberration generating region, which region is located in the optical path between the first lens element and the information layer of the record carrier; and the method further comprising:

writing data to an information layer of the record carrier during a scanning operation; and altering the optical characteristics of the device during the scanning operation in order to compensate for a spherical aberration generated in the record carrier.

21. An optical scanning device for scanning an optical record carrier having an information layer, the device comprising:

a compound objective lens, for positioning in an optical path between a radiation source and an information layer of an optical record carrier, for converging a radiation beam to a spot on the information layer, the objective lens including at least a first lens element arranged to converge the beam to a certain convergence and a second lens element arranged to converge the beam to a greater convergence; and a spherical aberration compensation optical subsystem including an electro-optical element for altering an optical path length in a spherical aberration generating region, which region is located in the optical path between the first lens element and the information layer of the record carrier.

* * * * *